United States Patent [19]

Nieson

[11] 4,024,574
[45] May 17, 1977

[54] VALIDATION METHOD AND APPARATUS FOR PAY TELEVISION SYSTEMS

[75] Inventor: Norman Nieson, Massapequa, N.Y.

[73] Assignee: Teleglobe Pay TV System Inc., Rego Park, N.Y.

[22] Filed: Feb. 26, 1975

[21] Appl. No.: 553,436

[52] U.S. Cl. .................. 358/117; 340/146.1 A; 358/124

[51] Int. Cl.$^2$ .......................... H04N 1/44

[58] Field of Search .............. 178/5.1, DIG. 13; 340/146.1 A

[56] References Cited

UNITED STATES PATENTS

| | | | |
|---|---|---|---|
| 3,081,377 | 3/1963 | Watters | 178/5.1 |
| 3,757,035 | 9/1973 | Sullivan | 178/5.1 |
| 3,781,472 | 12/1973 | Goode et al. | 178/22 |
| 3,824,332 | 7/1974 | Horowitz | 178/5.1 |
| 3,885,089 | 5/1975 | Callais et al. | 178/5.1 |
| 3,886,302 | 5/1975 | Kosco | 178/5.1 |
| 3,899,633 | 8/1975 | Sorenson | 178/5.1 |
| 3,916,091 | 10/1975 | Kirk, Jr. et al. | 178/5.1 |

Primary Examiner—Maynard R. Wilbur
Assistant Examiner—S. C. Buczinski
Attorney, Agent, or Firm—Marianne Rich

[57] ABSTRACT

A predetermined pattern of code signals is periodically inserted into the transmitted encoded television signal. The pattern is so chosen that a bistable circuit at the receiver changes state for each received signal. A counter counts the number of state changes and, if correct, a validation signal is furnished. The validation signal allows recording of the billing charge for the program and transmission of the decoded signal to the television receiver.

12 Claims, 7 Drawing Figures

VALIDATION METHOD AND APPARATUS FOR PAY TELEVISION SYSTEMS

BACKGROUND OF THE INVENTION

The present invention resides in pay television systems and, more specifically, in such systems wherein a determined characteristic of the composite television signal is changed either periodically or aperiodically at the temperature prior to transmission and code signals are added to the signal to indicate which, if any, of a number of predetermined changes have taken place. Each receiver of the pay-television system has a decoder to process the received encoded signal (i.e. to decode), in accordance with a decoder mode set up to correspond to the transmitted code only after a charge has been properly entered for the program.

In known systems of the above-described type, it is possible that the decoder mode is improperly set and the subscriber is billed for a program which he does not actually receive or which is not properly decoded.

SUMMARY OF THE INVENTION

It is an object of the present invention to provide a system and method for validating the reception of code signals in a code corresponding to the mode of operation in which the decoder is then operating prior to billing and prior to conveying the decoded television signal from the decoder to the receiver.

The present method resides in a pay television system (including cable and over-the-air) having a transmitter, an encoder connected to said transmitter for encoding the television signal prior to transmission in accordance with a determined code, a conventional receiver, decoding apparatus operable in a plurality of decoder modes and having an output connectable to said receiver for receiving the encoded composite television signal and furnishing a corresponding standard composite television signal to said receiver in response thereto, and externally operable program selector means for switching said decoding apparatus to a selected one of said modes corresponding to said determined code. The present invention is a method for furnishing a validation signal signifying correspondence between said selected one of said modes and said determined code. It comprises the steps of periodically transmitting a predetermined pattern of code signals adapted to create a predetermined sequence of signal levels in said decoding apparatus, if said decoder mode corresponds to said predetermined code. It further comprises monitoring said decoding apparatus to detect said sequence of signal levels if present. Finally it comprises furnishing said validation signal in response to a so-detected sequence.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
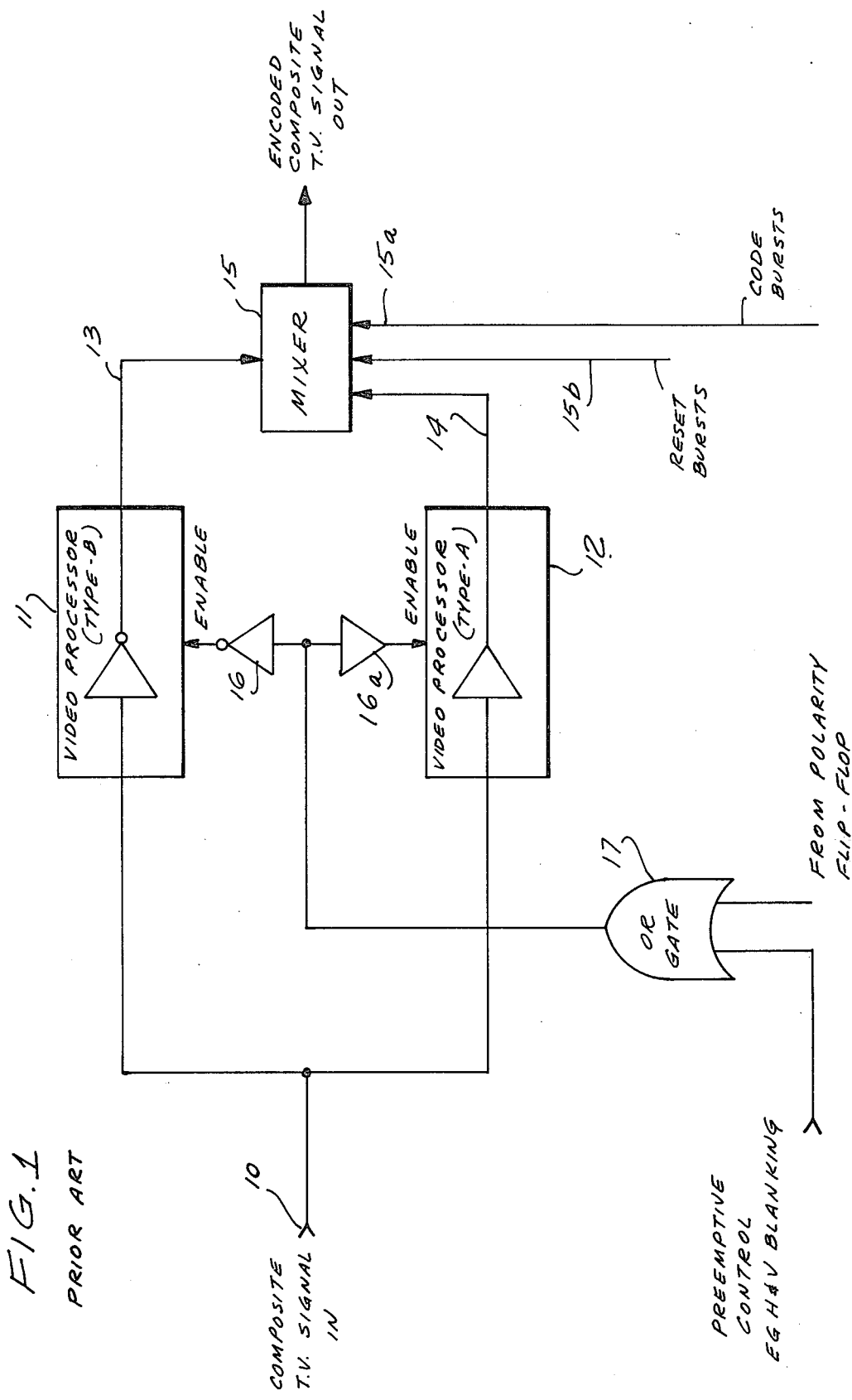
FIG. 1 is one embodiment of a prior-art encoding apparatus with which the present invention cooperates.

Before describing the method and system of the present invention in detail with reference to the drawing, a somewhat more detailed description of a system in which the present invention resides is required. Although the preferred embodiment will be discussed in relation to this particular system the invention is of course applicable to the validation of codes in other systems also and is not to be limited to this particular illustration. For this purpose applicant wishes to make specific reference to U.S. application Ser. No. 227,582 (Horowitz) filed Feb. 18, 1972, now Patent No. 3,824,332 and U.S. application Ser. No. 552,787 (Loshin) filed Feb. 25, 1975. One of the features of the aboveidentified Horowitz patent is the invention of the video signals within the composite television signal which will be briefly summarized with respect to FIG. 1. Shown in FIG. 1 is an input 10 for receiving a composite television signal. It should be noted that the term "composite television signal" is used herein to include not only the video signals which will herein be defined as the signals conveying the picture information but also all required synchronizing signals such as the horizontal and vertical synchronizing signals and any required color bursts, etc. It is this standard composite television signal which is received at input 10. Input 10 constitutes the input to two amplifiers which are connected in parallel. The first of these amplifiers 11, is an inverting amplifier while the second, 12, is a non-inverting amplifier. The outputs of amplifiers 11 and 12 are applied through lines 13 and 14 respectively to a mixer 15 which further has an input 15a for receiving code burst and an input 15b for receiving reset bursts. The output of this mixer is the encoded composite television signal.

As also shown in FIG. 1, amplifier 11 is enabled by the output of an inverting amplifier 16, while amplifier 12 is enabled by the output of a non-inverting amplifier 16a. Both amplifier 16 and amplifier 16a receive the same input signal. Thus one of the amplifiers is automatically disabled when the other one is enabled. The common input signal to amplifiers 16 and 16a is derived from an OR-gate 17. The inputs to OR-gate 17 are a first input receiving pre-emptive control signals occurring throughout the horizontal and vertical blanking intervals and a second input for receiving signals designed to enable the non-inverting amplifier 12 when desired, during those portions of the composite television signal wherein the video signals are being transmitted.

While the detailed circuitry of FIG. 1 is not part of the present invention, it should be noted that the output of mixer 15 of FIG. 1 is an encoded television signal whose synchronizing portions are unchanged, but whose video signals are inverted in polarity in the absence of a signal to the second input of OR-gate 17. This signal is derived from a a bistable circuit, herein referred to as a "polarity flip-flop". Further, in order that this inversion may be compensated for at the receiver, code signals are added at input 15a of the mixer at predetermined time instants during the vertical blanking interval. At the receiver, the code bursts serve to set a polarity flip-flop to the corresponding state as the polarity flip-flop at the transmitter, thereby causing re-inversion of the video portions of the received signal as required.

In the copending application reference above, a coding system and method is disclosed wherein code bursts, that is oscillations of different frequencies, are applied within predetermined horizontal line intervals in the vertical blanking interval. In one preferred embodiment of that application, six code bursts are utilized. A control panel is furnished which allows assignment of any of these code bursts to either an "A" mode, a "B" mode, a "C" mode or a "D" mode. Any code burst assigned to the A mode causes the polarity flip-flop to be reset. Any code burst assigned to the B mode causes the polarity flip-flop to be set, while a D code burst causes a toggling of the polarity flip-flop, that is the polarity flip-flop state is changed. Tone bursts assigned to the C mode do not affect the polarity flip-flop at all but are used simply to confuse possible "pirates" that is people wishing to break the code in order to avoid payment of fees. These code bursts are inserted into the composite television signal during predetermined lines of the vertical blanking interval, and as identified by their frequency, constitute the code. The lines may be sequential lines or they may be arbitrarily selected so that Remote Control, VIT, VIR signals or others my may placed in their normal time slots. In a preferred application, the assignment of the code bursts ad identified by their frequency constitutes the code. This code is varied for each television program. The decoder circuit at the receiver must thus be correspondingly set for each program. It is now the purpose of the present invention to check the proper set-up of this code, the receipt of the proper incoming signal and also in part the proper operation of the decoder system at the receiver prior to punching the billing card or otherwise making the subscriber liable for a charge for the program. This is accomplished by periodically transmitting code bursts which are preselected so as to flip the polarity flip-flop in accordance with a predetermined pattern under the burst assignment which characterizes the particular program code. Thus periodically and in a preferred embodiment of the present invention about once every second, instead of the randomly selected coding occurring during the vertical blanking interval, a coding which results in a predetermined pattern of states of the polarity flip-flop is transmitted. The number of changes of the state of the polarity flip-flop at the decoder is counted and, if correct, and an "accept" button is pressed, the punching of the billing card proceeds and the program is received. In the event that the number of state changes of the polarity flip-flop is incorrect, the punching of the billing card and activation of stages of the decoder not required for validation is inhibited as mentioned above and, further, a light may light indicating to the subscriber that his decoding equipment is not operating properly.

Figure 2:
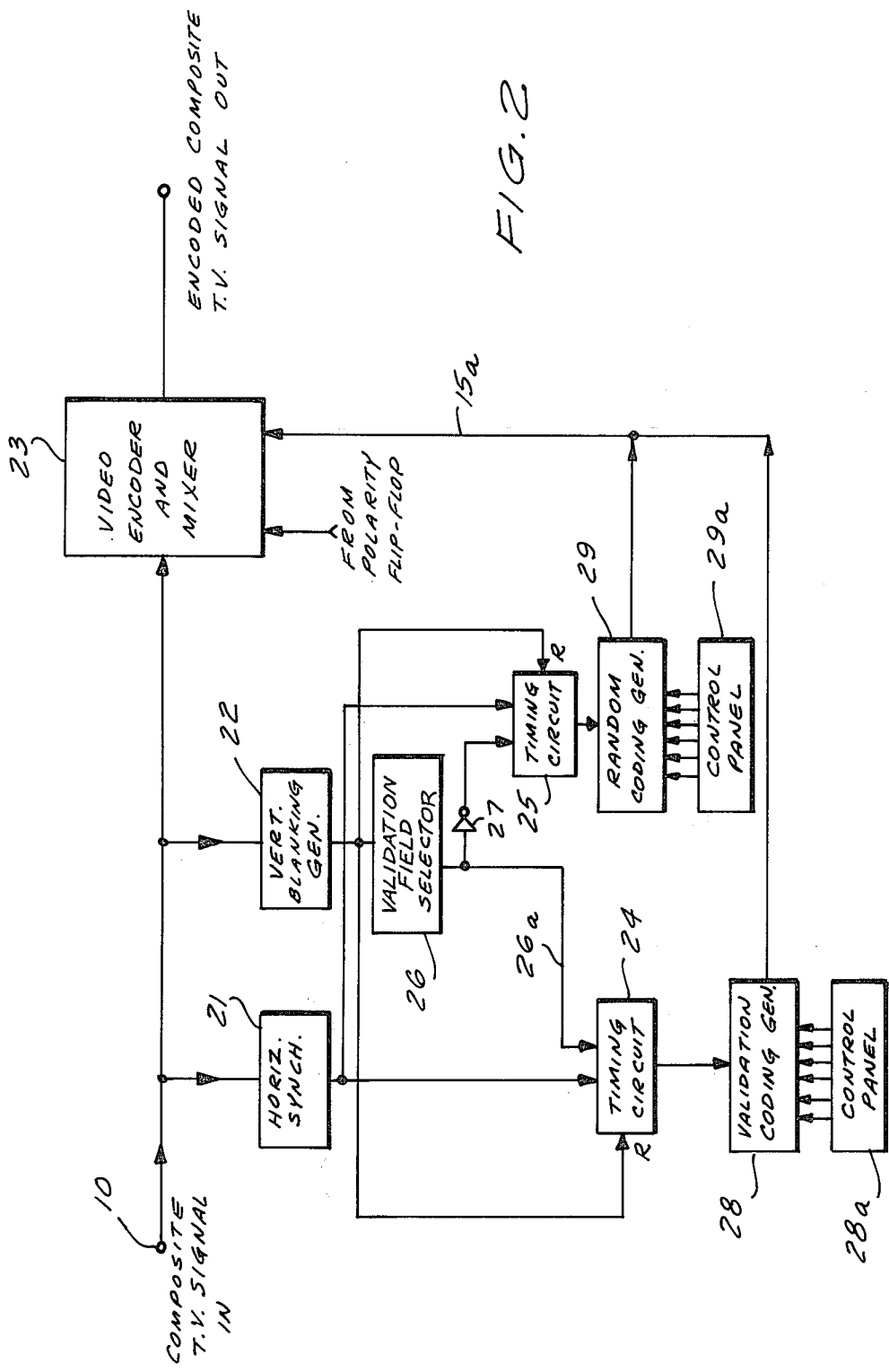
FIG. 2 is a block diagram showing the interconnection between the prior art and the present invention.

The interconnection between the validation code generator of the present invention and the random coding generator of the above-identified application is shown in FIG. 2. In FIG. 2 the video signal is received at terminal 10. The horizontal synchronizing signals are extracted and applied to one input each of timing circuit 24 and timing circuit 25. The vertical synchronizing signals are applied to a second inputs of timing circuits 24 and 25, both labelled R. The third input for timing circuit 24 is the output of the validation field selector (counter 26) while the third input of timing circuit 25 is the same signal but after inversion through an inverter 27, so that one or the other timing circuits 24, 25 is always activated. The output of timing circuit 24 is connected to the validation coding generator 28 having an associated control panel 28a, while the output of timing circuit 25 is connected to the random coding generator 29 which has an associated control panel 29a. The outputs of the random and the validation coding generators are fed into video encoder and mixer 23. The video encoder and mixer 23 is of course the circuit shown in FIG. 1. It also receives the input from the polarity flip-flop. Its output is the encoded composite television signal.

The operation of the system is as follows: Timing circuit 24 is a counter which receives the horizontal synchronizing signal at its counting input and is reset by the vertical synchronizing signal. It furnishes outputs activating the validation code generator only during selected lines and only when enabled by the signal on line 26a from the validation field selector 26. During other fields no output is furnished at the output of timing circuit 24 and validation coding generator 28 is inactive. During those fields during which the signal on line 26a is absent a signal is applied through inverter 27 to timing circuit 25. Timing circuit 25 is similar to timing circuit 24 and furnishes an output during the same line intervals as does timing circuit 24, but only during those fields in which timing circuit 24 is inactive. Each output of timing circuit 25 enables random coding generator 29. During the same lines in each field, and more specifically, during the same lines within the vertical blanking interval of each field either the random coding generator 29 or the validation coding generator 28 is thus activated. In a preferred embodiment of the present invention the validation field selector 26 is so adjusted that the validation coding generator is operated approximately once per second.

Figure 3:
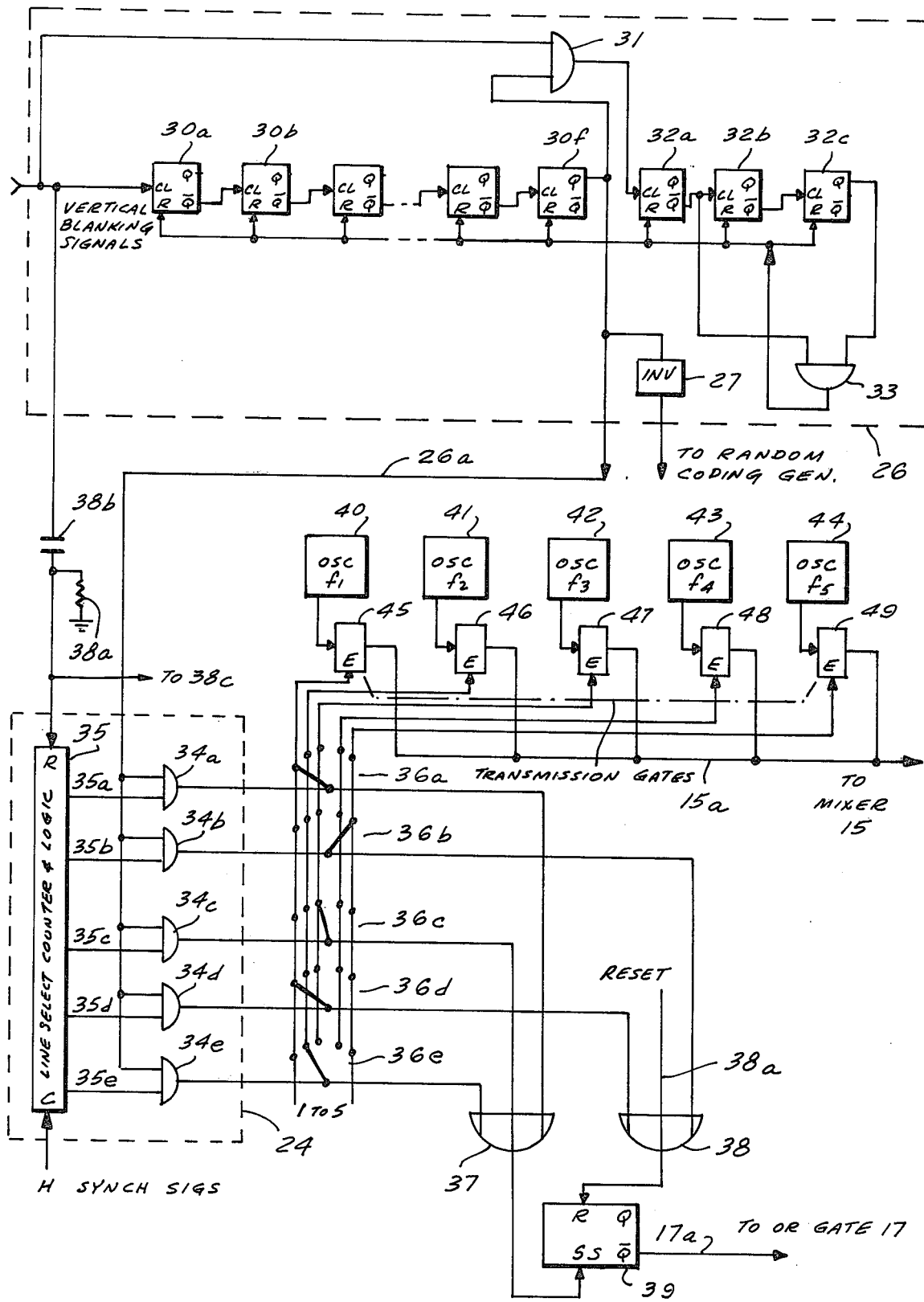
FIG. 3 is a circuit diagram of the timing and validation code signal generator of the present invention.

The validation coding generator and its associated control panel and timing circuitry are shown in greater detail in FIG. 3. Shown in FIG. 3 is the validation field selector 26 which receives vertical blanking signals which are in turn applied to a six-stage counter including flip-flops 30a – 30f. The output of flip-flop 30f is connected to line 26a which corresponds to line 26a of FIG. 2. It is further connected to first input of an AND-gate 31 whose second input also receives the vertical blanking signals. The output of AND-gate 31 is connected to a three-stage counter including flip-flops 32a – 32c. The output of flip-flop 32a and that of 32c are applied respectively to the first and second input of an AND-gate 33 whose output is used to reset all flip-flop stages 30a – 30f and 32a – 32c.

In operation validation field selector 26 counts the incoming vertical synchronizing signals. Since each of stages 30b – 30f is set to have an active output at its Q output when the preceding stage changes from a Q to a Q̄ output, an active signal will appear at the Q output of flip-flops 30f after sixty-four vertical synchronizing signals have been received. This signal will remain throughout the subsequent four fields since the reset signal will not be derived from the output of AND-gate 33 until a "101" signal appears on flip-flops 32a – 32c. Thus a signal will appear on line 26a for four consecutive fields once every sixty-seven fields, that is approximately once per second.

The signal on line 26a is then used to enable timing circuit 24. Specifically, timing circuit 24 comprises five AND-gates 34a – 34e. Line 26a is connected to the first input of each of these AND-gates. Timing circuit 24 further comprises a line select counter and logic counter 35 having outputs 35a – 35e. Outputs 35a – 35e are respectively connected to the second inputs of AND-gates 34a – 34e. The counting input of unit 35 receives the horizontal synchronizing signals, while its reset input receives the differentiated vertical blanking signal from a line 38a. The outputs of AND-gates 34a – 34e constitute the timing circuit outputs.

Timing circuit 24 operates as follows: Unit 35 comprises a counter which is reset by the leading edge of each vertical blanking signal. The counts on this counter thus represent the number of horizontal synchronizing signals received following the start of a vertical blanking signal. Unit 35 contains logic circuitry which selects predetermined counts, that is predetermined horizontal line intervals following the start of a vertical blanking signal, and furnishes signals signifying these selected line intervals on outputs 35a – 35e, respectively. Each of AND-gates 34a – 34e will thus furnish an output during a predetermined line interval in the vertical blanking interval of the validation fields.

The output signals of AND-gates 34a – 34e, herein referred to as timing signals, are applied to the selector arms of five externally operable selector switches labelled 36a – 36e. Further, the timing signal from AND-gates 34a, 34c and 34e are applied to the first, second and third input of an OR-gate 37, while the timing signals from AND-gates 34b and 34d are applied to the first and second inputs of an OR-gate 38. The third input to OR-gate 38 is a reset signal derived from the leading edge of the vertical blanking signal. The output of OR-gate 37 is applied to the set input of a flip-flop 39 which is the polarity flip-flop, while the output of OR-gate 38 is applied to the reset input of polarity flip-flop 39. The $\overline{Q}$ output of flip-flop 39 is applied to the second input of OR-gate 17 of FIG. 1 (line 17a).

Further shown in FIG. 3 are five oscillators numbered 40, 41, 42, 43, and 44, respectively. Each of these oscillators furnishes an output having a different frequency ($f_1 \ldots f_5$) in the KHz – MHz range. The outputs of oscillators 40 – 44 are applied, respectively, to the inputs of transmission-gates 45 – 49. The output of these transmission-gates 45 – 49 are connected in common to a line 50 which in turn is connected to mixer 15 of FIG. 1.

Switches 36a – 36e each have five contacts, corresponding contacts of the switches being connected in common. All first contacts of switches 36a – 36e are connected to the enable input of transmission-gate 45, all second contacts to the enable input of transmission-gate 46, all third contacts to the enable input of transmission-gate 47, all fourth contacts to the enable input of transmission-gate 48 and all fifth contacts to the enable input of transmission-gate 49.

To explain the operation of the circuitry of FIG. 3, it must be remembered that at the decoder the transitions of the flip-flop corresponding to flip-flop 39, that is of the polarity flip-flop, from one state to the other will be counted and that, only if this number is equal to a predetermined number, the circuits will be assumed to be validated. In a preferred embodiment the predetermined number is chosen to be equal to the maximum number of transitions (i.e. one transition for each code burst including the first) of the polarity flip-flop during each validation field. As an example let it be assumed that frequency $f_5$ is assigned to what shall hereinafter be referred to as the A mode, namely a mode wherein flip-flop 39 is reset and the video signal (see FIG. 1) is not inverted. Further it will be assumed that frequency $f_3$ is assigned to mode B, that is a mode wherein the polarity flip-flops both at the transmitter and receiver are set and the video signal is not inverted. Frequency $f_2$ will also be assumed to be assigned to the B mode while frequency $f_1$ will be assigned to the D mode, that is a mode wherein the polarity flip-flops are toggled, that is changed from one state to the other regardless of the original state. Frequency $f_4$ will be assigned to the C mode, which, in a preferred embodiment of the present invention, is a mode which does not affect either of the polarity flip-flops but is added for confusion purposes only.

It will be assumed that the timing signals from AND-gates 34a – 34e occur sequentially in time in that order, with the signal from AND-gate 34a occurring first and that from AND-gate 34e occurring last. Since the maximum number of transitions of the state of flip-flop 39 is desired for validation purposes (so that the assignment of each active code burst frequency is tested as unambiguously as possible) the switches must be set so that flip-flop 39 undergoes a transition in each line interval. Thus all frequencies assigned to the B mode must be selected for odd-numbered line intervals, all frequencies assigned to the A mode for even numbered line intervals and all D mode frequencies must each be selected for both an even-numbered and an odd-numbered line interval. As an example, switches 36a – e are set as follows: Positions 1, 5, 3, 1, 2 respectively.

The resulting validation signal will thus test out whether the signal of frequency $f_1$ will serve both to switch the polarity flip-flops from the set to the reset and from the reset to the set state. 36a – 36e could of course have been set differently. The only restriction is that the signal assigned to the D mode must be used both to switch from the set to the reset and from the reset to the set state and that the first signal must be a signal which will cause a transition in the flip-flop. Thus the signal associated with switch 36a must either be a D mode signal or a B mode signal.

It will be noted that frequency $f_4$ is not being tested. Frequencies assigned to the C mode would not result in a transition and are therefore not tested here. If a separate test of C mode frequencies is desired this would be accomplished by transmitting only C mode bursts and testing for zero transitions.

In accordance with the setting of switches 36a – 36e, the circuit will now operate as follows: During the first selected line, namely upon occurrence of timing signal at the output of AND-gate 34a, flip-flop 39 will be set and signal $f_1$ will appear on line 15a and be applied to mixer 15. Upon occurrence of the next-selected line, namely upon an output of AND-gate 34b, frequency $f_5$ will be applied to line 15a and flip-flop 39 will be reset. Upon occurrence of an output from AND-gate 34c flip-flop 39 will be set, the third transition to be counted at the decoder. During this line interval a signal frequency $f_3$ will be applied to line 15a. An output from AND-gate 34d will cause flip-flop 39 to be reset, causing the fourth transition to be counted and, simultaneously a signal of frequency $f_1$ will be applied to line 5a. Similarly when an output appears at AND-gate 34e, the frequency $f_2$ will be applied to line 15a, while flip-flop 39 is set. The correct coding bursts have thus been applied to the mixer and therefore to the composite television signal. It only remains to note with respect to FIG. 3, that the polarity flip-flop at the encoder, namely flip-flop 39, does not actually require a toggle input if switches 36a – 36e are set properly so that a corresponding transition occurs in response to each so-assigned code burst.

Figure 4:
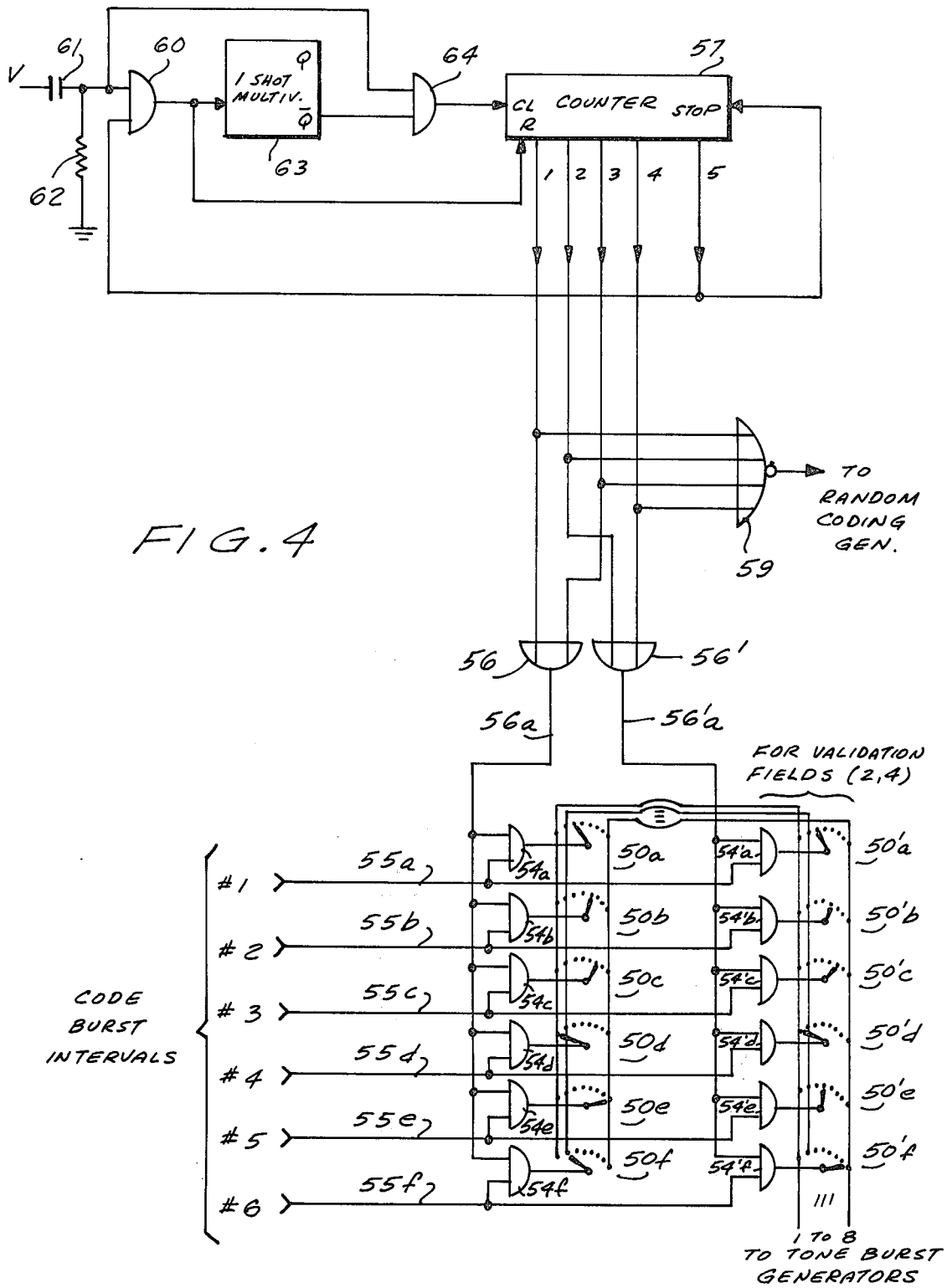
FIG. 4 is an alternate embodiment of the circuitry of FIG. 3.

In the above-described validation encoder only one frequency assigned to the A mode, two to the B mode, and one to the D mode were tested. Since two time slots are required for validating the D mode signal while one time slot each is required for the A or B mode, the available five time slots were sufficient to provide a validation of these four active frequencies in the code only. However, under practical conditions more code burst frequencies may be available than there are time slots in each field. A system for generating the validation codes under these conditions is shown in FIG. 4. Here it is assumed that there are eight code burst generators and six time slots available for each field. Selector switches 36a – 36e of FIG. 3 are here replaced by two banks of six selector switches each, numbered 50a – 50f 50f and 50'a – 50'f respectively. Corresponding contacts of all switches are connected in common. The so-connected first contacts are used to activate tone burst generator 1, the so-connected second contacts tone burst generator 2, etc. The selector arms of switches 50a – 50f receive a signal from the output of AND-gates 54a – 54f, while the selector arms of switches 50'a – 50'f are energized by the outputs from AND-gates 54'a – 54'f. Each of the above-named AND-gates has a first input connected to the output of a line selector 35 as shown in FIG. 3, that is a signal is received at the first input of each AND-gate during a corresponding line in the vertical blanking interval. These signals are applied on lines 55a – 55f, are the same for both banks of AND-gates and are similar to lines 35a – 35e of FIG. 3. The second inputs of AND-gates 54a – 54f are connected in common to a line 56a which is energized from the output of an OR-gate 56. Similarly, the second inputs of AND-gates 50'a – 50'f are connected in common to a line 56'a which is connected to the output of an OR-gate 56'. OR-gate 56 has a first and second input respectively connected to receive the "1" and "3" outputs of a counter 57, while OR-gate 56' has two inputs respectively connected to the "2" and "4" outputs of counter 57. The "5" output of counter 57 is connected to a stop input of this counter, thereby preventing any further signals at the clock input from being counted. It is also applied to the first input of an AND-gate 60. The other input of AND-gate 60 receives a signal at the time of the leading edge of the vertical blanking signal. This is derived by differentiation from the vertical blanking signal through a differentiating network comprising a capacitor 61 and resistor 62. The output of AND-gate 60 is applied to trigger input of a one-shot multi-vibrator 63. One-shot multivibrator 63 is a non-retriggerable multivibrator. A signal to its triggering input causes it to switch to the unstable state wherein the Q output is generated. This state lasts for approximately one second. The multivibrator 63 then automatically returns to the state wherein the output is furnished to terminal $\overline{Q}$. Terminal $\overline{Q}$ is connected to one input of an AND-gate 64 whose other input also receives the differentiated vertical blanking signal. The output of AND-gate 64 is applied to the counting input of counter 57.

In the above-described circuit, a pulse is applied to the counting input of counter 57 at the start of each vertical blanking interval if, and only if, the multivibrator is in its stable state, that is an output appears at the $\overline{Q}$ terminal. Counter 57 thus furnishes signals sequentially on lines 1, 2, 3, 4 and 5 for the five fields following the time that multivibrator 63 has returned to the stable state. When a signal appears at counter output 5 the counting process is stopped. A signal is applied to the second input of AND-gate 60 so that the next subsequent vertical blanking signal will cause a signal to appear at the output of AND-gate 60, causing a triggering of mulitivibrator 63 and therefore interrupting the application of pulses to the counting input of counter 57. The same signal also resets counter 57 to zero. Since the signals on lines 1 and 3 both energize OR-gate 56, the first bank of switches 50a – f will be active during the first and third fields, while the second bank of switches 50'a – f will be active during the second and fourth fields. The assignment of frequencies to the different line intervals in each of the two banks of switches is obvious and will not be further discussed here. It should further be noted that a NOR-gate 59 is provided having four inputs, respectively connected to the 1, 2, 3 and 4 outputs of counter 57. This NOR-gate furnishes an output signal which inhibits the operation of the random coding generator during the operation of the validation code generator.

The waveform resulting at the output of the video encoder and mixer 23 of FIG. 2, that is encoded composite television signal which is transmitted then has tone bursts in predetermined line intervals occurring during the vertical blanking interval. For this example these will be assumed to be lines numbered 1, 2, 3, 4, 5, and 6 in FIG. 4. During the validation fields, that is during a sequence of consecutive fields occurring at intervals of approximately one second, the tone bursts in these line intervals are such that, for the then active code, a maximum number of transitions of the polarity flip-flop will occur.

Figure 5:
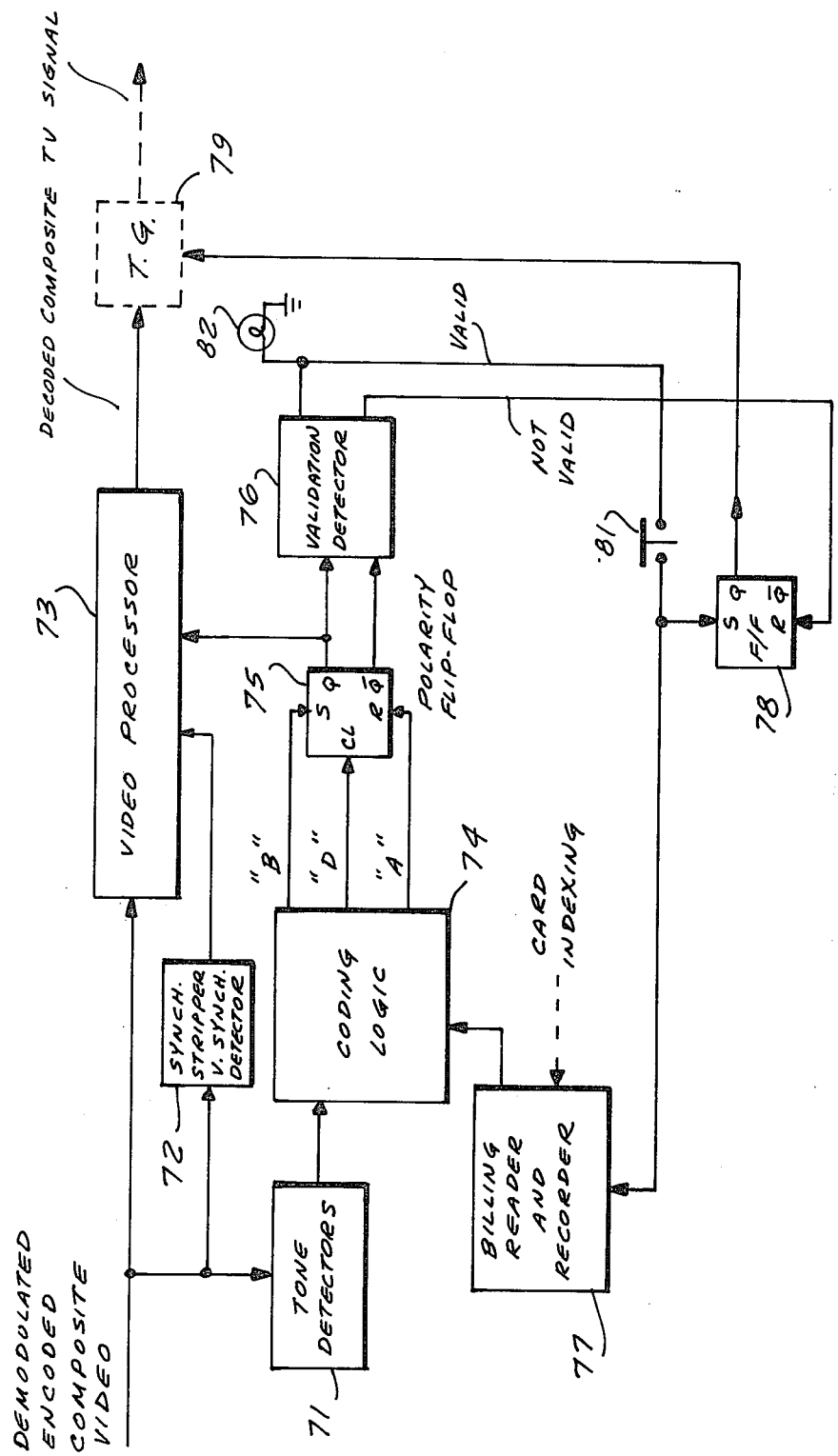
FIG. 5 is a block diagram showing the interconnection of the present invention with the decoding apparatus of the pay television system.

The so-transmitted signal is received at the receiver, demodulated, and the resultant demodulated and coded composite television signal is applied to the validation circuitry shown in FIG. 5. As shown in FIG. 5, the signal is applied to the video processor 73. Video processor 73 corresponds to the video processing equipment shown in FIG. 1 and operates in synchronism therewith. That is, the video portion of the signal is either inverted or not inverted in accordance with the output of polarity flip-flop 75. The output of video processor, which is the decoded composite television signal, is then applied to a transmission gate 79 which is gated to the transmissive state only in response to the validation signal as will be explained below. The demodulated encoded composite video signal is further applied to tone detectors 71. The output of the tone detector circuit is shown as a single line but of course in reality encompasses a plurality of lines. The output of the tone detectors is applied to coding logic 74. Coding logic 74 is set up for a particular code by means of billing reader and recorder 77. The particular decoder mode corresponding to the transmitter code is set up by indexing a billing card within the billing reader. In a preferred embodiment of the invention, there is a different code and, therefor, mode for each program, this code being premarked on the billing card. The billing reader and recorder has sensors which sense the marks on the card and set up coding logic 74 accordingly. The sensor are of any suitable type such as mechanical, photoelectric or magnetic. Coding logic 74 then furnishes outputs on lines "A", "B" and "D" in accordance with the logic which has been set up and in response to signals furnished by tone detectors 71. It will be seen that a signal on line A resets polarity flip-flop 75, a signal of line B sets flip-flop 75, while a signal on line D causes polarity flip-flop 75 to switch from whichever state it is in to the other. The Q output of polarity flip-flop 75 is then applied to video processor 73 to control the inversion of the video signal and is further applied to validation detector 76. The $\overline{Q}$ output of polarity flip-flop 75 is also applied to validation detector 76 in a preferred embodiment of the present invention.

Validation detector 76 has a "valid" and a "not valid" output. The valid output is applied through a switch 81, which is activated by the subscriber when he wishes to receive a program, to billing reader and recorder 77 and the set input of a flip-flop 78. Thus when a signal appears on the valid line and switch 81 is closed, billing reader and recorder 77 will be activated to record the charge for the program and, further, flip-flop 78 will be switched to render a signal on its Q output. This is the signal which causes transmission gate 79 to become transmissive and a standard composite signal to appear at its output. This, after remodulation onto a suitable carrier is applied to the input of a standard TV receiver.

The valid signal is also applied to a lamp 82 whose lighting indicates to the subscriber that the program will be available and that the charge will be recorded if switch 81 is activated.

Figure 6:
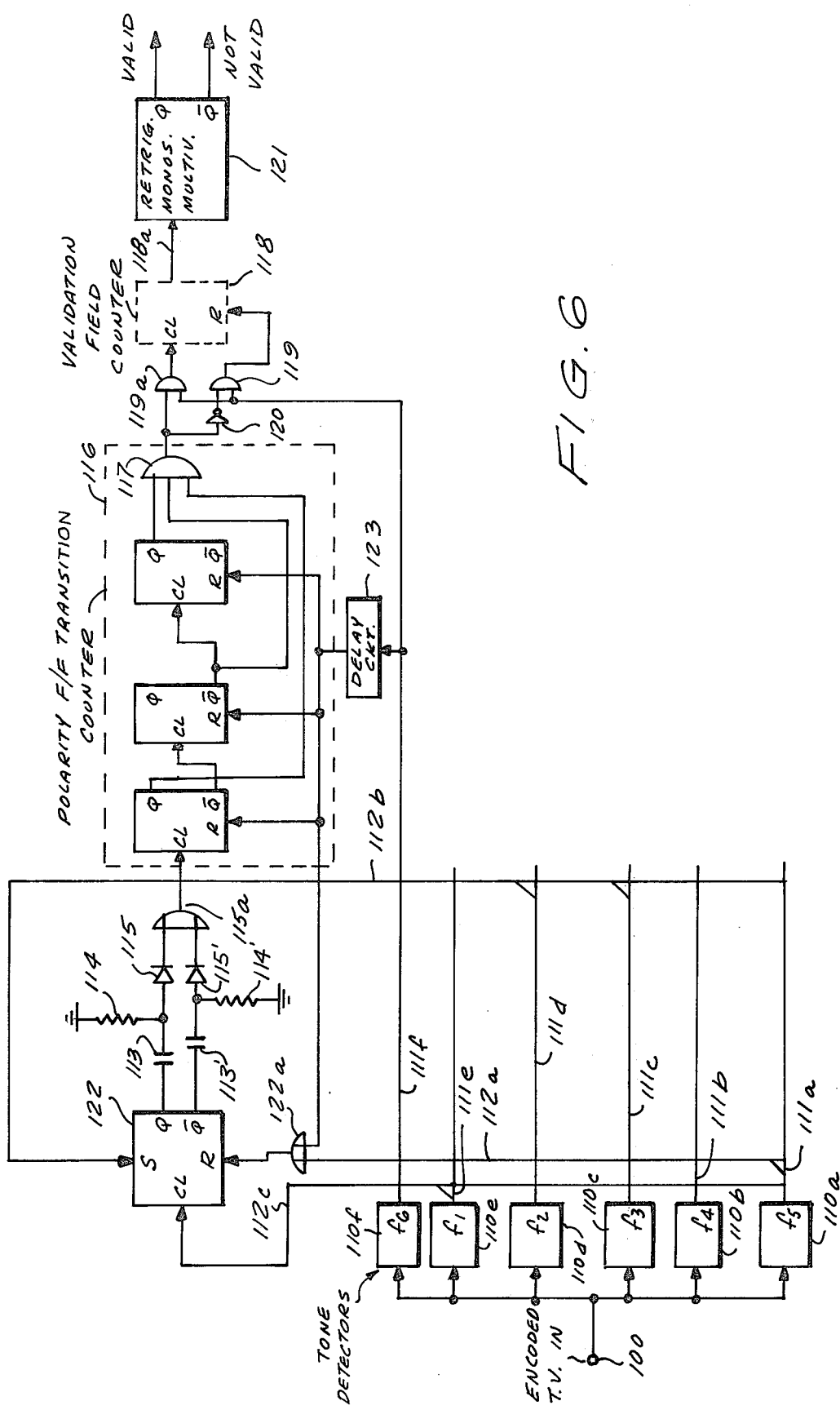
FIG. 6 is a circuit diagram of the validation circuitry of the decoder.

The not valid signal is used to reset flip-flop 78. Thus in the event that validation is not achieved, transmission gate 79 will not become conductive and the decoded composite television signal will not be available for reception. FIG. 6 is a more detailed diagram of the decoder validation circuit. Shown in FIG. 6 are five code burst detectors labelled 110a – 110e and an additional detector labelled 110f. Each of course is tuned to a different frequency. The output of code burst detectors 110a – 110e is applied to corresponding lines 111a – 111e. The lines form the horizontal lines in a crossbar switching matrix. The vertical lines in the switching matrix are numbered 112a – 112c. Lines 112a – 112c are, respectively, connected to the reset, the set and the toggle input of the polarity flip-flop. There is no vertical line for C mode signals and since these do not affect the polarity flip-flop at all. In the embodiment shown in FIG. 6, insertion of the billing card causes the connection to be made from line 111a to line 112a, no connection from line 111b, from line 111c to line 112b, from line 111d to line 112b, line 1113 to line 112c. A proper validation code sequence at the transmitter for this particular code would thus be the sequence of code bursts: $f_1, f_5, f_3, f_1, f_2$, as generated in the validation code generator of FIG. 3. Receipt of code burst frequency $f_1$ causes a signal to appear on line 111e which in turn is connected to the line 112c, causing polarity flip-flop 122 to toggle to the set state. Receipt of the code burst frequency $f_5$ causes a signal to appear on line 111a which is connected to line 112a and through an OR-gate 112a causes the flip-flop to reset. Receipt of signal $f_3$ furnishes a signal on line 111c which is connected to line 112b causing the flip-flop to set. Receipt of a further signal $f_1$ again causes a signal to appear on line 111e which is connected to line 112c and causes the flip-flop to toggle to the reset state. Receipt of a tone burst of frequency $f_2$ causes a set state of the flip-flop 122 via lines 111d and 112b. Five transitions of the flip-flop have thus been accomplished by one set of code bursts.

Indicated in FIG. 6 is also a tone detector 110f which responds to a reset burst $f_6$. This reset burst is transmitted at the start of each vertical blanking interval. (See also FIG. 7 and the associated description.)

Two differentiating circuits each comprising a capacitor (113,113'), a resistor (114,114') and a diode (115,115') are tied respectively to the Q and $\overline{Q}$ outputs of polarity flip-flop 122. The outputs of the differentiating circuits are applied through an OR-gate 115a to the input of a polarity flip-flop transition counter 116. This is a standard counter which comprises a plurality of flip-flops, in tis case three flip-flops, wherein each subsequent state is set to a "1" output when the previous state makes the transition from "1" to "0". The flip-flop stages are labelled 116a, 116b, and 116c. The $\overline{Q}$ output of stage 116b as well as the Q outputs of stage 116a and c are applied to the inputs of an AND-gate 117. The reset input for all counter stages are permanently tied in common to line 111f through a delay circuit 123 as is the reset input of flip-flop 122. Delay circuit 123 furnishes a predetermined short time delay. The output of AND-gate 117 is connected to the counting input of a validation field counter 118 which in structure is the same as the polarity flip-flop transition counter includes three flip-flop stages and an AND-gate, a count of four yielding an output. The reset input of validation field counter 118 is connected to the output of AND-gate 119.

The first input of AND-gate 119 is connected to the output of an inverter 120 whose input is connected to the output of polarity flip-flop transition counter 116. The second inputs of AND-gates 119 and 119a are connected to line 111f. The output of counter 118 triggers a retriggerable monostable multivibrator 121 whose time constant is approximately 10 seconds. The output of monostable multivibrator 121 constitutes the validation signal.

The circuit operates as follows:

Each transition of the polarity flip-flop causes a signal to be applied to polarity flip-flop transition counter 116. Each of these transitions is thus counted. A count of five transitions (101) causes an output to appear at AND-gate 117. This output will be counted by counter 118. At the beginning of the next vertical blanking interval counter 116 will be reset as will the polarity flip-flop, by the slightly delayed signal at the corresponding reset inputs furnished as a result of the receipt of a reset burst. The counting process of counter 116 will then recommence. If a valid code is again received there will again be an output from counter 116 which will again be applied to the input of counter 118 when a signal appears on line 111f. If four such counts are received a signal appears on line 118a which triggers monostable multivibrator 1221 whose time constant is approximately ten seconds. The output of monostable multivibrator 121 thus indicates the receipt of four sequential validation fields and causes light 82 to light. Activation of button 81 then allows the charge to be entered on the billing card by billing reader and recorder 77 (FIG. 5) and the decoded composite television signal to be available at the receiver.

In the event that validation does not occur, that is in the absence of a signal at the output of counter 116, a signal will be applied to the first input of AND-gate 119. At the beginning of the next vertical blanking interval a signal will also appear at the second input of AND-gate 119. The presence of the two signals than causes a pulse to be applied to the reset inputs of counter 118. This counter will thus be reset. It will then again require receipt of four sequential validation fields to render an output on line 118a to create a validation signal. It will be noted that the retriggerable monostable multivibrator 121 represents a type of storage. The validation signal will thus be maintained after having first been established, even if validation cannot be established again for a determined time interval. This as mentioned above, is 10 seconds in the embodiment of FIG. 6.

Figure 7:
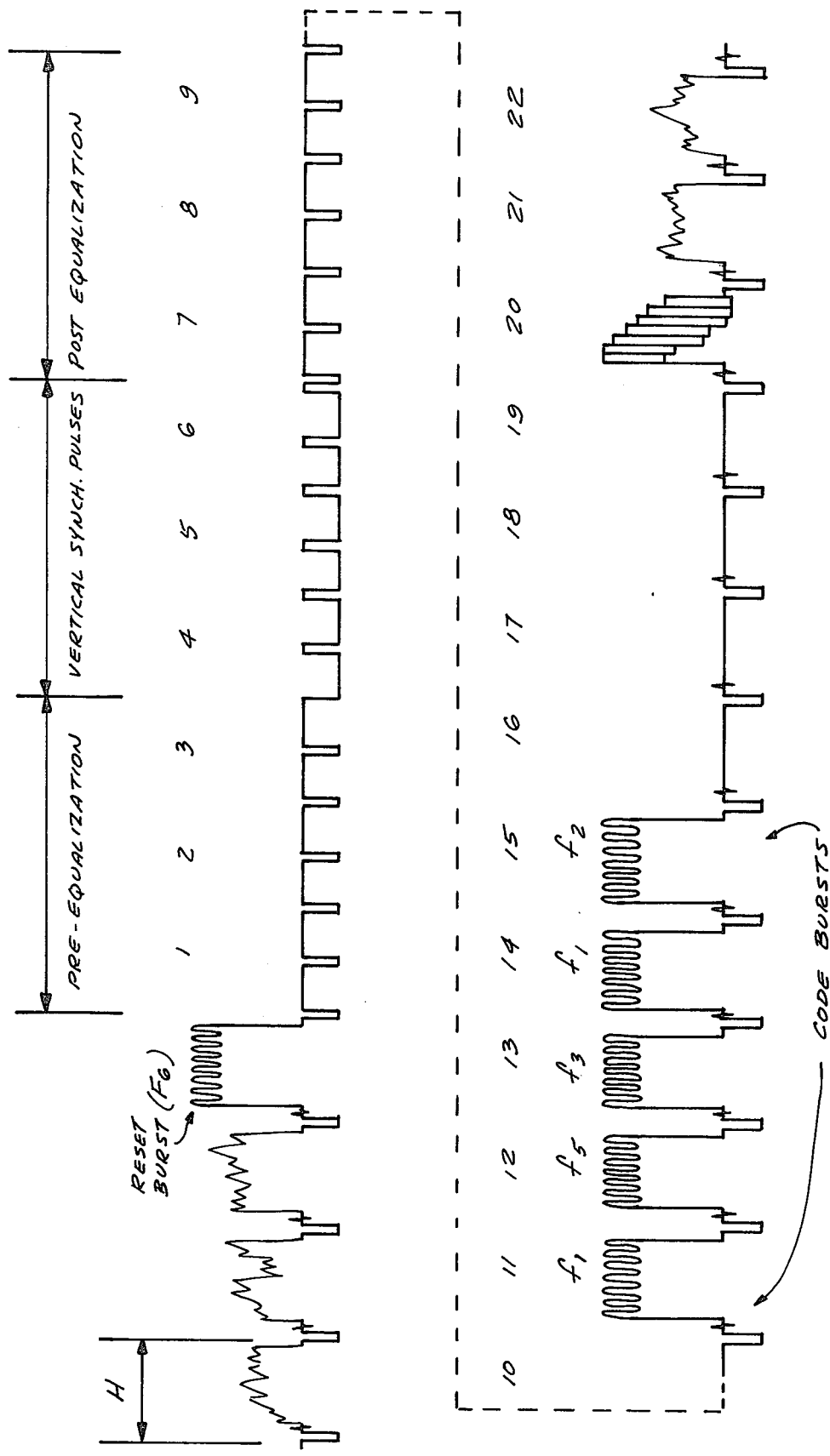
FIG. 7 is a diagram showing the wave shape during the vertical blanking interval of the encoded television signal during a validation field.

FIG. 7 shows a wave diagram of the encoded composite television signal after demodulation which of course is the demodulated encoded composite television signal of FIG. 5. What is shown is the vertical blanking interval with tone bursts of frequency $f_6$ (for reset) $f_1, f_5, f_3, f_2$ appearing in that order. (Actually the tone burst of frequency $f_6$ occurs in the horizontal line interval immediately preceding the vertical blanking interval.)

It will be noted that certain lines in the vertical blanking interval are left free for standard control signals and test signals which may be transmitted with the signal. It should again be noted that the order in which the frequencies appear is of course determined at the transmitter. while the function which each frequency carries out with respect to the polarity flip-flop of the decoder is determined by the crossbar connections made in accordance with a predetermined code between lines 111a – 111e on the one hand and lines 112a – 112c on the other hand at the receiving end (FIG. 6). It should further be noted that while the circuit of FIG. 6 corresponds to the encoder diagram shown in FIG. 3, it is of course possible to add a great many more tone detectors 110 and equivalent additional tone generators at the encoder in order that the code used is even harder to circumvent. The indexing of the billing card would then simply result in further interconnections between lines 112a – 112c and the additional lines 111. Further, the exact manner in which the billing card provides these connections in different positions is incidental to the present invention. Thus, the relevant portion of billing card reader and recorder 77 has electrically conductive mechanical feelers in a preferred embodiment of the present invention. These are electrically connected to lines 111 and make contact with lines 112 when a hole appears in the billing card. Other means including electro-optical means could be used for the same purpose.

It is seen that the present invention provides a simple method and system for preventing the operation of the billing portion of the decoder until such time as a receipt of the proper code has been validated.

Without further analysis, the foregoing will so fully reveal the gist of the present invention that others can, by applying current knowledge, readily adapt it for various applications without features that, from the standpoint of prior art, fairly constitute essential characteristics of the generic or specific aspects of this invention.

What is claimed as new and desired to be protected by Letters Patent is set forth in the appended claims:

1. In a pay television system having a transmitter, encoder means coupled to said transmitter for encoding the television signal prior to transmission in accordance with a selected one of a plurality of codes whereby said transmitter transmits an encoded composite television signal, a receiver, decoding means operable in a plurality of decoder modes corresponding in number to said plurality of codes and having a connection to said receiver, for receiving said encoded composite television signal and furnishing a corresponding standard composite television signal to said receiver in response thereto when in a selected decoder mode corresponding to said selected code, and program selector means for switching and decoding means to said selected mode: apparatus for furnishing a validation signal signifying correspondence between said selected decoder mode and said selected code, comprising, in combination, validation code signal generator means connected to said encoder means for inserting a sequence of code signals into said television signal under the control of timing signals, said sequence of code signals being adapted to create a predetermined sequence of signal levels in said decoder means if said decoder means is in said selected mode corresponding to said selected code; timing singal furnishing means connected to said validation code signal generator means for furnishing said timing signals at determined time instants in said television signal, said timing signal furnishing means comprising means for furnishing timing signals each occurring in a selected line of a selected field in said television signal, each only in response to a selected field signal; wherein said television signal has vertical blanking intervals; further comprising means for furnishing said selected field signals at the start of selected ones of said vertical blanking intervals, said means for furnishing a selected field signal comprising first counting means for counting vertical blanking signals and furnishing a first selected field signal when the so-counted number of vertical blanking signals is equal to a first predetermined number; and second counting means connected to the output of said first counting means for counting subsequent ones of said vertical blanking signals and furnishing additional selected field signals until the count on said second counting means is a second predetermined number, whereby said validation sequence of code signals is transmitted for a predetermined number of consecutive fields equal to said second predetermined number at time intervals corresponding to the sum of said first and second predetermined number; monitoring means in said decoding means for detecting said sequence or signal levels if present; and validation signal furnishing means connected to said monitoring means for furnishing said validation signal in response to a so-detected sequence.

2. In a pay television system having transmitter means at a transmitter location for transmitting an encoded television signal, means connected to said transmitter means for furnishing a plurality of code signals each differing from the others of said code signals and inserting said code signals into said television signal prior to transmission, encoder means connected to said transmitter means and said means for furnishing a plurality of code signals and operable in a plurality of encoder modes, for changing a predetermined characteristic of said television signal from a first to a second value in response to at least one of said code signals selected in accordance with a selected one of said encoder modes, code selector means connected to said encoder means for selecting said one of said encoder modes, decoder means at a receiver location, operable in a plurality of decoder modes corresponding to said plurality of encoder modes, for receiving said encoded television signal, separating said code signals from said encoded television signal, and changing said predetermined characteristic of said television signal back to said first value in response to said at least one of said code signals when in a decoder mode corresponding to said selected one of said encoder modes, and program selector means connected to said decoder means for switching said decoder means to said corresponding decoder mode: a method for furnishing a validation signal only if said decoder means is in said corresponding decoder mode, comprising, in combination, the steps of generating at said transmitter location a predetermined validation pattern of code signals, said predetermined pattern of code signals being adapted to create a determined sequence of signal levels in said decoder means only if said decoder means is in said corresponding decoder mode; periodically suppressing the insertion of said plurality of code signals into said television signal and substituting therefor said predetermined validation pattern of code signals; transmitting said encoded television signal including said predetermined validation pattern of code signals to said decoder means; monitoring said decoder means to detect said sequence of signal levels if present; and furnishing said validation signal in response to a so-detected sequence.

3. A method as set forth in claim 2, wherein said pay television system further comprises receiver means connected to said decoder means for receiving said decoded television signal; further comprising the step of blocking the transmission of signals from said decoder means to said receiver means in the absence of said validation signal and transmitting signals from said decoder means to said receiver means in the presence of said validation signal.

4. A method as set forth in claim 3, further comprising the step of recording a charge for said program only in response to said validation signal.

5. A method as set forth in claim 2, wherein said decoder means has at least one bistable circuit having a first and second stable state, and logic circuit means for switching said bistable circuit to said first and second stable states in response to, respectively, first and second ons of said plurality to code signals selected in accordance with the then-present decoder mode; wherein said step of transmitting a predetermined validation pattern of code signals comprises transmitting a validation pattern of code signals adapted to create a predetermined number of changes of state of said bistable circuit only if said then present decoder mode is said corresponding decoder mode; wherein said step of monitoring said decoder means comprises the step of counting the number of changes of state of said bistable circuit; and wherein said step of furnishing said validation signal comprises furnishing said validation signal only if the so-counted number of changes of state is equal to said predetermined number.

6. A pay television system, comprising, in combination, transmitter means at a transmitter location for transmitting an encoded television signal; code signal furnishing means connected to said transmitter means, for furnishing a plurality of code signals each differing from the others of said code signals and inserting said plurality of code signals into said television signal prior to transmission; encoder means connected to said transmitter means and said means for furnishing a plurality of code signals and operable in a plurality of encoder modes, for changing a predetermined characteristic of said television signal from a first to a second value in response to at least one of said plurality of code signals selected in accordance with a selected one of said plurality of encoder modes; code selector means connected to said encoder means for selecting said one of said plurality of encoder modes; decoder means at a receiver location, operable in a plurality of decoder modes corresponding to said plurality of encoder modes, for receiving said encoded television signal, separating said code signals from said encoded television signal, and changing said predetermined characteristic of said television signal back to said first value in response to said at least one of said plurality of code signals when in a decoder mode corresponding to said selected one of said encoder modes; program selector means connected to said decoder means for switching said decoder means to said corresponding decoder mode; validation code signal generator means connected to said encoder means for generating a predetermined validation pattern of code signals, said predetermined validation pattern being adapted to create a predetermined sequence of signal levels in said decoder means if said decoder means is in said corresponding mode; validation selector means connected to said code signal furnishing means and said validation code signal furnishing means for periodically blocking the insertion of said plurality of code signals into said television signal and inserting instead said predetermined validation pattern of code signals, whereby said predetermined validation pattern of code signals is transmitted to said decoder means; monitoring means in said decoder means for detecting said sequence of signal levels if present; and validation signal furnishing means connected to said monitoring means for furnishing said validation signal in response to a so-detected sequence.

7. Apparatus as set forth in claim 6, further comprising receiver means connected to said decoder means for receiving said decoder television signal; and means for permitting the transmission of signals from said decoder means to said receiver means only in response to said validation signal.

8. Apparatus as set forth in claim 6, wherein said decoder means has at least one bistable circuit having a first and second stable state, and logic circuit means for switching said bistable circuit to said first and second stable states in response to, respectively, first and second ones of said plurality of code signals selected in accordance with the then-present decoder mode; wherein said validation code singal generator means comprises means for generating a predetermined validation of code signals adapted to cause a predetermined number of changes of state of said bistable circuit if said then present decoder mode is said corresponding decoder mode; wherein said monitoring means comprise counting means for counting the number of changes of state of said bistable circuit; and wherein said validation signal furnishing means comprises means for furnishing said validation signal if the so-counted number of changes of state is equal to said predetermined number.

9. A pay television system as set forth in claim 6, wherein said validation code signal generator means comprises means for inserting said predetermined validation pattern of code signals into said television signal under control of timing signals; further comprising timing signal furnishing means for furnishing said timing signals, each in a selected line of a selected field in said television signal.

10. A pay television system as set forth in claim 9, wherein said timing signal furnishing means comprise means for furnishing timing signals only in response to a selected field signal; whererin said television signal has vertical blanking intervals; further comprising means for furnishing said selected field signals at the start of selected ones of said vertical blanking intervals.

11. A pay television system as set forth in claim 10, wherein said means for furnishing a selected field signal comprise counting means for counting sequential blanking signals and furnishing a counting output signal in response to each so-counted signal, and activating means for activating said counting means at predetermined time intervals, said counting output signals constituting said selected field signals.

12. A pay television system as set forth in claim 11, wherein said counting means furnishes a stop signal following a predetermined number of counting output signals; and wherein said activating means comprise a multivibrator having a stable state and having an unstable state for said predetermined time interval following receipt of a trigger signal at a trigger input, means for applying said stop signal to said trigger input, and logic circuit means for interconnecting said multivibrator to said counting means in such a manner that said counting means receives counting signals only when said multivibrator is in said stable state.

* * * * *